(12) United States Patent
Wang et al.

(10) Patent No.: US 8,503,058 B2
(45) Date of Patent: Aug. 6, 2013

(54) ETALON WITH TEMPERATURE-COMPENSATION AND FINE-TUNING ADJUSTMENT

(75) Inventors: Ruibo Wang, Oak Park, CA (US); Ming Wu, Pleasanton, CA (US); Ming Cai, Fremont, CA (US)

(73) Assignee: Oclaro Technology Limited, Northamptonshire (GB)

( * ) Notice: Subject to any disclaimer, the term of this patent is extended or adjusted under 35 U.S.C. 154(b) by 528 days.

(21) Appl. No.: 12/777,169

(22) Filed: May 10, 2010

(65) Prior Publication Data

US 2011/0273758 A1    Nov. 10, 2011

(51) Int. Cl.
    *G02F 1/03*       (2006.01)
    *G01B 9/02*       (2006.01)
(52) U.S. Cl.
    USPC .......................... 359/260; 356/454

(58) Field of Classification Search
    USPC ................ 359/247, 260, 302, 317; 356/454
    See application file for complete search history.

(56) References Cited

U.S. PATENT DOCUMENTS

2003/0095261 A1*  5/2003  Gu ................................ 356/454

* cited by examiner

*Primary Examiner* — William Choi
(74) *Attorney, Agent, or Firm* — Fenwick & West LLP

(57) ABSTRACT

An etalon has an effective cavity length that can be tuned to compensate for temperature-dependent frequency shift and/or for random variations in the manufacturing process. The effective cavity length of an etalon is adjusted by changing the orientation of a tuning plate positioned in the etalon cavity. A screw adjustment and bending beam spring are used to change tuning plate orientation and precisely tune the etalon resonance frequency after the manufacturing process has been completed. Orientation of the tuning plate is adjusted during operation of the etalon using a passive thermal compensation mechanism, such as a bimetal support arm, which is fixed to the tuning plate and configured to reposition the tuning plate with changing temperature.

19 Claims, 4 Drawing Sheets

ETALON WITH TEMPERATURE-COMPENSATION AND FINE-TUNING ADJUSTMENT

BACKGROUND OF THE INVENTION

1. Field of the Invention

Embodiments of the present invention relate generally to optical communication systems and components and, more particularly, to an etalon with temperature-compensated cavity length and a post-assembly fine-tuning adjustment.

2. Description of the Related Art

Fiber optic communication systems are becoming increasingly popular for data transmission due to their high speed and high data capacity. Wavelength division multiplexing (WDM) is used in such fiber optic communication systems to transfer a relatively large amount of data at a high speed. In WDM optical systems, multiple information-carrying channels may be transmitted along the same optical fiber, each channel comprising an optical signal of a specific restricted wavelength range. Thus, WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure, so that what would normally require multiple optic links or fibers instead requires only one.

The capacity of a WDM system is a function of the number of channels that can be carried in a single fiber, and is limited by the channel spacing between wavelength channels. Such wavelength channel spacing is generally defined by an international telecommunications union (ITU) grid. For example, one ITU grid used by WDM optical systems has a channel spacing requirement of 100 GHz, where the spacing is referenced in terms of a frequency spacing corresponding to a channel center wavelength spacing of 0.8 nm. Another such ITU grid has a channel spacing requirement of 50 GHz, thereby allowing a single fiber to carry twice as many channels as a fiber operating at a 100 GHz spacing. Because different portions of a WDM optical system may operate with different channel spacings, optical interleavers are used in such systems to combine multiple wavelength channels carried on two fibers at a wider channel spacing, e.g., 100 GHz, into a single optical signal that is carried on a single fiber and having a narrower channel spacing, e.g., 50 GHz. Similarly, optical deinterleavers are used in WDM systems to divide a multi-channel optical signal having a narrow channel spacing into two multi-channel optical signals having wider channel spacing and carried on two separate fibers.

One device commonly used in the art as part of interleavers/deinterleavers is the Fabry-Pérot interferometer, also known as an etalon, which is a structure that introduces a phase difference between the even and odd channels of a multi-channel optical signal to facilitate physical separation of the channels making up the signal into two groups. Interleavers/deinterleavers commonly incorporate one or more etalons to increase the width of passbands and isolation bands of the individual wavelength channels, thereby providing greater ease of alignment of the channels to an ITU grid. As channel spacing becomes increasingly narrow, e.g., 50 GHz and smaller, subtle factors significantly degrade etalon performance, such as small manufacturing variations of the etalons and drift caused by thermal expansion or contraction of etalon components during normal operation. For example, the center wavelength for a 25 GHz interleaver is preferably stabilized to within ±1 GHz of the desired ITU-defined value, but ambient temperature change is known to cause etalon cavity length to vary sufficiently to result in a 2-3 GHz center wavelength shift of the etalon. Similarly, minor but unavoidable manufacturing flaws can produce unwanted offset between the actual center wavelength of an etalon and the desired center wavelength. While an etalon is commonly tuned to an ITU grid during assembly by precisely positioning components of the etalon, such as a tuning plate, an epoxy baking process typically takes place after such a tuning procedure, and even extremely small relative movement between etalon components during such a process can result in the center wavelength of the etalon being permanently fixed with a significant offset from the desired center wavelength value for the etalon.

Accordingly, there is a need in the art for an etalon with temperature-compensated cavity length and/or a post-assembly fine-tuning adjustment.

SUMMARY OF THE INVENTION

One or more embodiments of the present invention provide an etalon with an effective cavity length that can be tuned to compensate for temperature-dependent frequency shift and/or for random variations in the manufacturing process.

An etalon according to an embodiment of the present invention includes first and second mirrors that form a cavity therebetween, a tuning plate disposed in the cavity, and a support for the tuning plate made of at least two materials having different CTEs to cause an angle formed between the tuning plate and an optical axis of the etalon to vary as a function of temperature. The cavity may contain any appropriate gas, e.g., air, or may be under vacuum.

An etalon according to another embodiment of the present invention includes first and second mirrors that form a cavity therebetween, a tuning plate disposed in the cavity, a support for the tuning plate, and a manual control for positioning the tuning plate with respect an optical axis of the etalon. The operation of the manual control varies an angle formed between the tuning plate and the optical axis of the etalon. The cavity may contain any appropriate gas, e.g., air, or may be under vacuum.

An etalon according to still another embodiment of the present invention includes first and second mirrors that form a cavity therebetween, where the length of the cavity changes as a function of temperature, and a tuning plate disposed in the cavity and having an angle of incidence with respect to the optical axis of the etalon that changes as a function of temperature to compensate for the change in the length of the cavity. The cavity may contain any appropriate gas, e.g., air, or may be under vacuum.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

One or more embodiments of the present invention provide an etalon with an effective cavity length that can be tuned to compensate for temperature-dependent frequency shift and/or for random variations in the manufacturing process. The effective cavity length of an etalon is adjusted by changing the orientation of a tuning plate, i.e., a glass plate or a wave plate, positioned in the etalon cavity. In some embodiments, the orientation of the tuning plate is adjusted after the manufacturing process has been completed to minimize the offset between the actual resonance frequency of the etalon and a desired resonance frequency. In such an embodiment, a screw adjustment and bending beam spring are used to precisely tune the etalon resonance frequency as desired. In some embodiments, orientation of the tuning plate is adjusted during operation of the etalon using a passive thermal compensation mechanism, such as a bimetal support arm, which is fixed to the tuning plate and configured to reposition the tuning plate with changing temperature, thereby correcting for temperature-dependent frequency shift of the etalon.

Figure 1A:
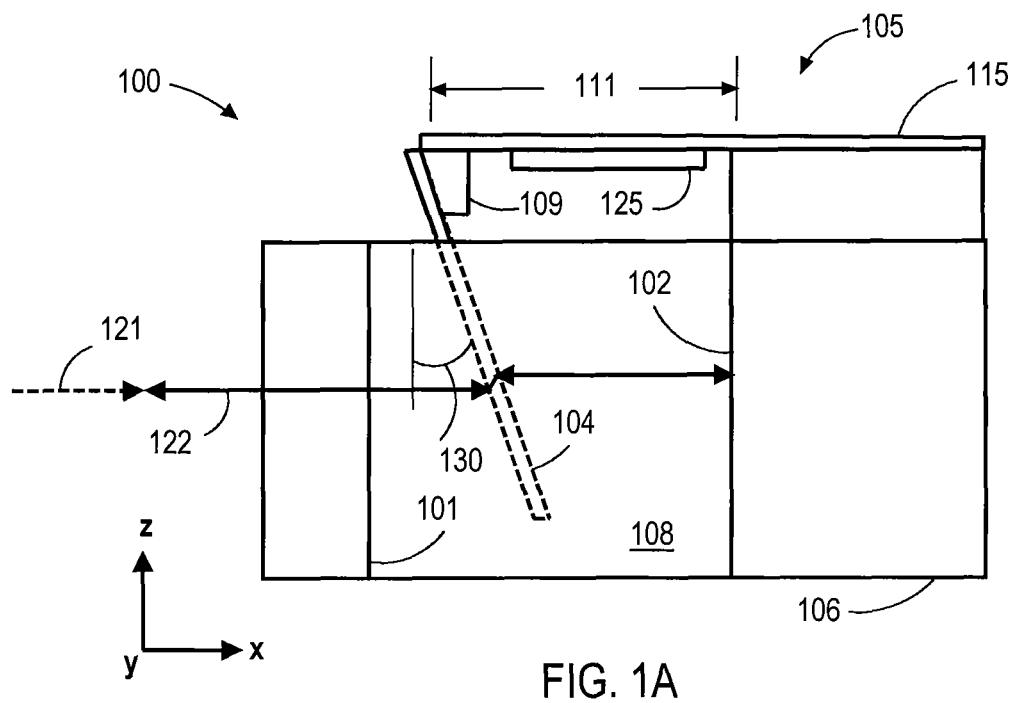
FIGS. 1A-1C are schematic views of an etalon having an effective cavity length that can be tuned to compensate for temperature-dependent frequency shift during normal operation of the etalon, according to embodiments of the invention.
Figure 1B:
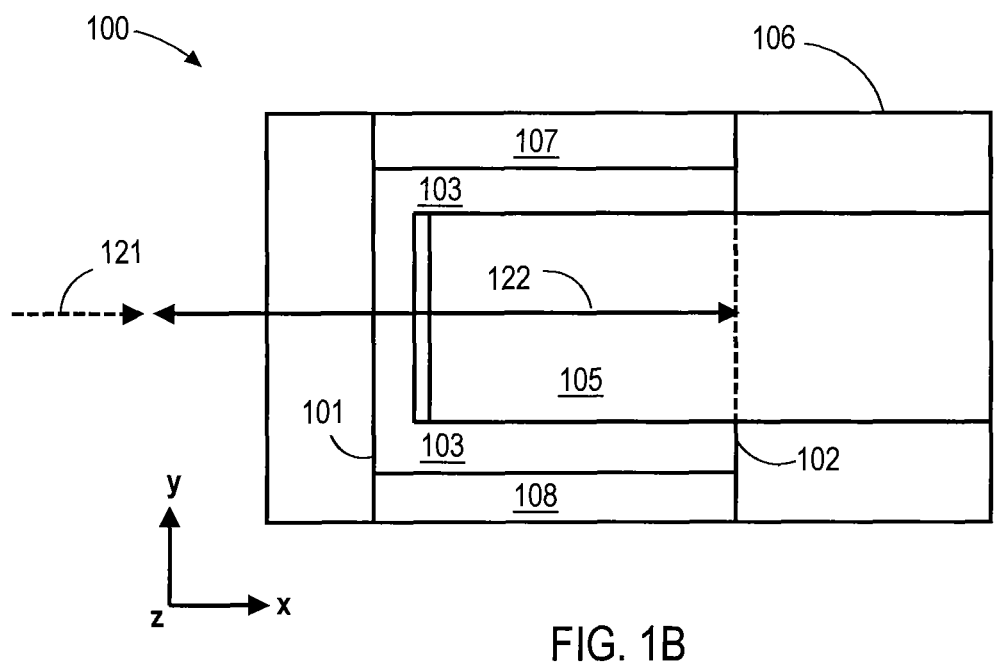
Figure 1C:
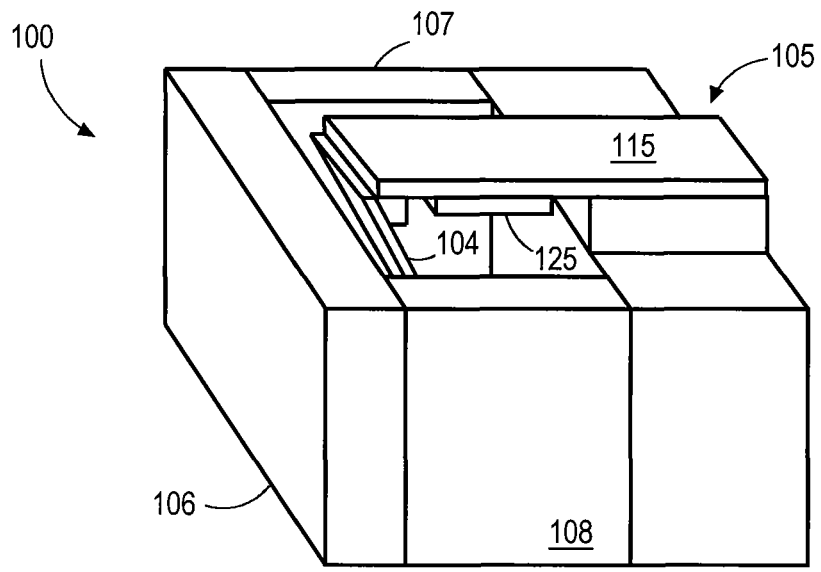

FIGS. 1A-1C are schematic views of an etalon 100 having an effective cavity length that can be tuned to compensate for temperature-dependent frequency shift during normal operation of etalon 100, according to embodiments of the invention. FIG. 1A is a side view of etalon 100, FIG. 1B is a top view of etalon 100, and FIG. 1C is a perspective view of etalon 100. Etalon 100 is constructed of two parallel reflecting mirrors 101, 102 and spacers 107, 108, which together form a body 106. Mirror 102 is a highly reflecting mirror having a reflectance substantially equal to 100%, and mirror 101 is a partially reflecting mirror having a reflectance of substantially less than 100%, e.g., 30%. Etalon 100 includes an air gap 103 disposed between and formed by mirrors 101, 102 and spacers 107, 108. Spacers 107, 108 may be comprised of a low thermal expansion material, such as ultra-low expansion glass, and may have a CTE as low at 0.1 ppm/° C. Etalon 100 further includes a tuning plate 104 positioned in air gap 103 and a bimetal support arm 105 that is fixed to tuning plate 104 and anchored to body 106. Tuning plate 104 is an optically transparent element, such as a glass plate or a wave plate, and is fixed to bimetal support arm 105 at a tilt angle 130 from the z-axis. For clarity, the thickness of tuning plate 104 and the constituent layers of bimetal support arm 105 are exaggerated with respect to other dimensions of etalon 100. In one embodiment, tuning plate 104 is mechanically coupled to bimetal support arm 105 via a support block 109, to facilitate a robust structural connection. For purposes of description, in FIGS. 1A, 1B, etalon 100 is oriented with mirrors 101, 102 parallel to the z-axis, the primary optical axis of etalon 100 is oriented parallel to the x-axis, and the y-axis is into the page.

In operation, a light beam 121, e.g., a multi-channel WDM optical signal, enters etalon 100 substantially parallel to the primary optical axis of etalon 100 and perpendicular to the surfaces of mirrors 101, 102, and follows an optical path 122 through etalon 100. Etalon 100 acts as an optical resonator, or cavity, with the transmission varying substantially periodically with respect to optical frequency. Constructive interference occurs when the transmitted beams, i.e., the optical channels, are in phase, and this corresponds to a high-transmission peak of etalon 100. If the transmitted beams are out-of-phase, destructive interference occurs, and this corresponds to a transmission minimum of etalon 100. Maximum transmission occurs when the optical path length difference between each transmitted beam is an integer multiple of the wavelength of a transmitted beam. In other words, etalon 100 has a transmission spectrum that, as a function of wavelength, exhibits peaks of large transmission corresponding to resonance frequencies of etalon 100, which in turn depend on the effective cavity length of etalon 100. Because the effective cavity length of etalon 100 depends on the tilt angle 130 of tuning plate 104, tilt angle 130 can be used to adjust the resonance frequencies of etalon 100. Embodiments of the invention contemplate the use of a temperature-sensitive actuator, i.e., bimetal support arm 105, to compensate for changes in the effective cavity length of etalon 100 due to thermal expansion or contraction of body 106.

As noted above, bimetal support arm 105 is fixed to tuning plate 104 and positions tuning plate 104 at a tilt angle 130 with respect to the z-axis. Bimetal support arm 105 includes at least two components, each comprised of a material having a different coefficient of thermal expansion (CTE). In the embodiment illustrated in FIG. 1, bimetal support arm 105 includes a low CTE plate 115 and a high CTE plate 125. Low CTE plate 115 and high CTE plate 125 are mechanically coupled as shown so that as the temperature of etalon 100 increases, bimetal support arm 105 bends in response to the CTE mismatch between low CTE plate 115 and high CTE plate 125. Consequently, tilt angle 130 of tuning plate 104 decreases, which reduces the effective cavity length of etalon 100, thereby compensating for the increase in the effective cavity length of etalon 100 that occurs due to the thermal expansion of spacers 107, 108.

The effective cavity length of etalon 100 is the optical path length between mirrors 101, 102, where optical path length is defined as the product of the geometric length of the path light follows through a system and the index of refraction of the medium through which it propagates. In etalon 100, the optical path includes the air of air gap 103 and tuning plate 104. Since the index of refraction of tuning plate 104 is significantly greater than that of air gap 103, and since the distance that light travels through tuning plate 104 decreases as tilt angle 130 decreases, the optical path length of etalon 100 is reduced as tilt angle 130 decreases. Such a reduction in optical path length of etalon 100 can be configured to compensate for the increase in optical path length of etalon 100 that occurs with increased temperature. Similarly, a decrease in temperature of etalon 100 results in an increase of tilt angle 130 that increases the optical path length of etalon 100, which can compensate for thermal contraction of etalon 100. It is noted that bimetal support arm 105 is a "passive" thermal compensation mechanism. Namely, no temperature control system, temperature-monitoring system, etc. are required to compensate for temperature-dependent frequency shift of etalon 100 during operation.

A number of physical characteristics of bimetal support arm 105 and tuning plate 104 influence changes in the optical path length of etalon 100, including the unsupported length 111 of bimetal support arm 105, the index of refraction of tuning plate 104, the CTE mismatch between low CTE plate 115 and high CTE plate 125, and the thickness of tuning plate 104, low CTE plate 115, and high CTE plate 125. Given a particular temperature range over which etalon 100 is to maintain constant optical path length, one of skill in the art can readily devise a configuration of bimetal support arm 105 and tuning plate 104 to compensate for thermal expansion of spacers 107, 108. In addition, one of skill in the art may readily configure tuning plate 104 with an initial tilt angle 130 that corresponds to approximately the center point of the temperature range over which etalon 100 is expected to operate, thereby maximizing the range of effective temperature compensation of the resonant frequency of etalon 100. In one embodiment, such an initial value for tilt angle 130 is approximately 10°.

In FIGS. 1A, 1B, bimetal support arm 105 is configured as two rectangular plates bonded together on a major surface of each of the plates, however, other configurations of a passive thermal compensation mechanism are also contemplated by embodiments of the invention. For example, bimetal support arm 105 may be comprised of more than 2 layers, each of which having a different CTE. In addition, each of the multiple layers making up bimetal support arm 105 may be a non-metallic material. In such an embodiment, the layers of the bimetallic support arm consists of at least a first and second elastic material layer, each layer having a substantially different CTE, where the CTE of each layer, the thickness of each layer, the length of bimetal support arm 105, and the thickness of tuning plate 104 are all selected so that, taken together, passive temperature compensation occurs and the effective optical length of etalon 100 remains substantially constant over a desired temperature range.

Figure 2:
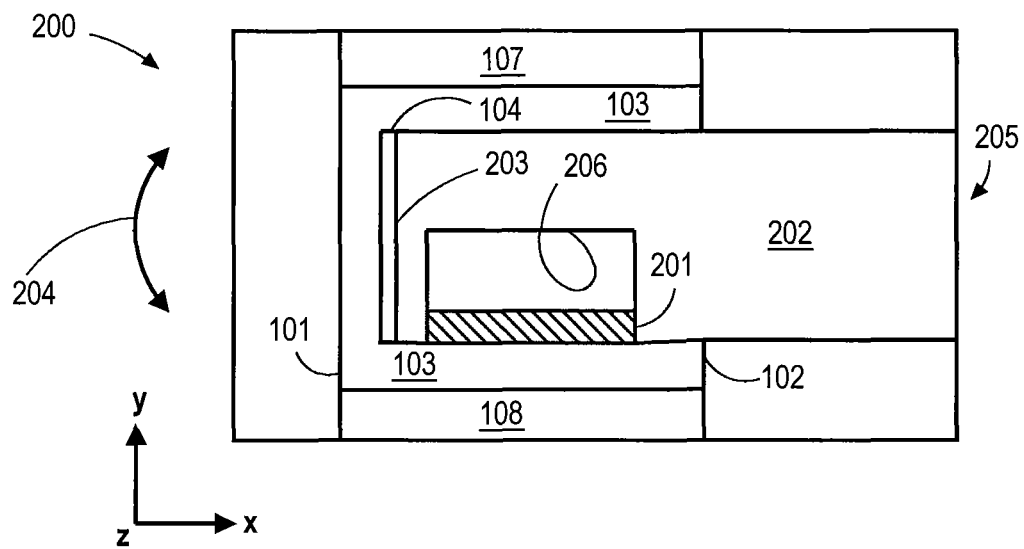
FIG. 2 is a schematic diagram of an etalon having a bimetal support arm configured with an expansion block and deflecting tuning plate support, according to an embodiment of the invention.

Alternatively, bimetal support arm 105 need not be configured as two or more rectangular plates to adjust the orientation of tuning plate 104 and compensate for thermal expansion and contraction of spacers 107, 108. FIG. 2 is a schematic diagram of an etalon 200 having a bimetal support arm 205 configured with an expansion plate 201 (shaded) and a deflecting support arm 202, according to an embodiment of the invention. FIG. 2 is a top view of etalon 200 and bimetal support arm 205, i.e., viewed down the z-axis, as etalon 100 is viewed in FIG. 1B. Deflecting support arm 202 is a substantially rectangular plate prepared with a cutout 206. Expansion plate 201 is configured to span cutout 206 and is positioned in cutout 206 as shown. Expansion plate 201 may be welded in place or otherwise mechanically coupled to support arm 202. Expansion plate 201 and deflecting support arm 202 are each comprised of a different material, each material having a substantially different CTE. In one embodiment, expansion plate 201 is a material having a relatively high CTE, such as aluminum (CTE of 23 ppm/° C.) or 304 stainless steel (CTE of 17.3 ppm/° C.), and deflecting support arm 202 is comprised of a material having a relatively low CTE, such as Invar (CTE of 1.2 ppm/° C.), which is a nickel-steel alloy. Other materials having a significant CTE mismatch may also be used for expansion plate 201 and deflecting support arm 202. As shown, tuning plate 104 is fixed to surface 203 of deflecting tuning plate support 202. As the temperature of bimetal support arm 205 changes, expansion plate 201 undergoes greater expansion or contraction than deflecting support arm 202. Consequently, surface 203 and tuning plate 104 rotate about the z-axis as depicted by arrow 204. As turning plate 104 is rotated in this manner, the effective optical length of etalon 200 remains substantially constant, because as temperature increases and spacers 107, 108 expand, bimetal support arm rotates tuning plate 104 to reduce the effective optical length a corresponding amount.

In the embodiment of the invention described herein, the passive thermal compensation mechanism is a support arm that is made of materials having different CTE. Other designs of a passive thermal compensation mechanism that impart an increase or decrease in the optical path length of a beam passing through the tuning plate to compensate for temperature-induced changes in the cavity length of the etalon, are also within the scope of the invention.

Embodiments of the invention further contemplate adjusting the orientation of a tuning plate in an etalon after the etalon has been assembled and the constituent components thereof have been fixed in position. By changing the orientation of the tuning plate, offset between the actual resonance frequency of the etalon and a desired resonance frequency of the etalon can be minimized. In such an embodiment, a screw adjustment and bending beam spring are used to precisely tune the etalon resonance frequency as desired.

Figure 3:
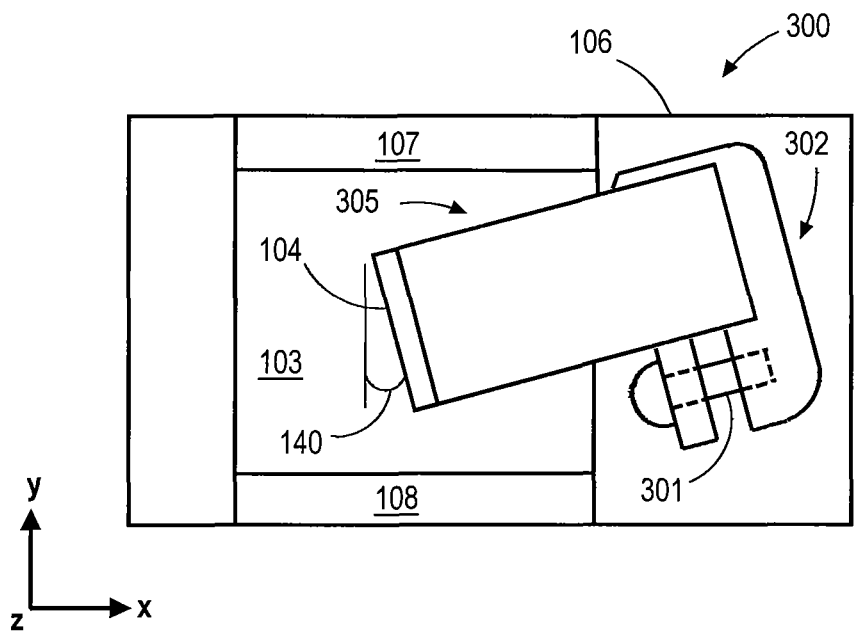
FIG. 3 is a schematic top view of an etalon with a screw adjustment and a bending beam spring for tuning the effective cavity length of the etalon after the assembly of the etalon is complete, according to embodiments of the invention.

FIG. 3 is a schematic top view of an etalon 300 with a screw adjustment 301 and a bending beam spring 302 for tuning the effective cavity length of etalon 300 after the assembly of etalon 300 is complete, according to embodiments of the invention. FIG. 3 is a top view of etalon 300 and a support arm 305, i.e., viewed down the z-axis, as etalon 100 is viewed in FIG. 1B. As shown, etalon 300 is substantially similar in operation and organization to etalon 100 in FIG. 1, except for the addition of screw adjustment 301 and a bending beam spring 302. In some embodiments, support arm 305 may be configured as a passive thermal compensation mechanism, such as bimetal support arm 105, to compensate for temperature-dependent frequency shift during operation of etalon 300. Screw adjustment 301 is a threaded fastener coupled to bending beam spring 302 and bending beam spring 302 is mounted to body 106 of etalon 300. Screw adjustment 301 is configured to compress bending beam spring 302 when rotated in one direction and to allow bending beam spring 302 to expand when rotated in the opposite direction. Compression and expansion of bending beam spring 302 results in the rotation of tuning plate 104 about the z-axis. Bending beam spring 302 may be fixed to body 106 during the same process by which mirrors 101, 102 and spacers 107, 108 are joined to form body 106, such as during a thermal epoxy baking process. Consequently, the effective cavity length of etalon 300 can be adjusted after any variations or dislocations in the relative positioning of the constituent parts of etalon 300 have occurred, so that the center frequency of etalon 300 can be precisely centered on a desired ITU grid value and unwanted offset from the ITU grid can be substantially eliminated. Tuning plate 104 may be oriented with an initial angle 140, so that tuning plate 104 may be rotated in either direction and the effective optical length of etalon 300 may be increased or decreased with screw adjustment 301.

In some embodiments, a screw adjustment tunes the effective cavity length of an etalon by rotating a tuning plate with respect to a first axis and a bimetal support arm rotates the tuning plate with respect to a second axis orthogonal to the first axis. In such an embodiment, the fine-tuning adjustment of the tuning plate is decoupled from compensation of thermal effects on cavity length performed by the bimetal support arm. In such embodiments, the bimetal support arm can be more accurately configured to adjust the orientation of the tuning plate over a specific range of motion that corresponds to a known temperature range, since the bimetal support arm is unaffected by the magnitude of fine tuning adjustment performed post-assembly with the screw adjustment.

Embodiments of the invention further contemplate the incorporation of temperature-compensated etalons into interleavers and deinterleavers for DWM optical communication systems. A number of interleaver/deinterleaver designs may benefit from etalons having temperature-compensated cavity length and/or post-assembly fine-tuning adjustment, as described above in conjunction with FIGS. 1A, 1B, 2, and 3. Interleaver/deinterleaver designs that may benefit from embodiments of the invention include Michelson-interferometer-based interleavers and birefringent interferometers.

Figure 4:
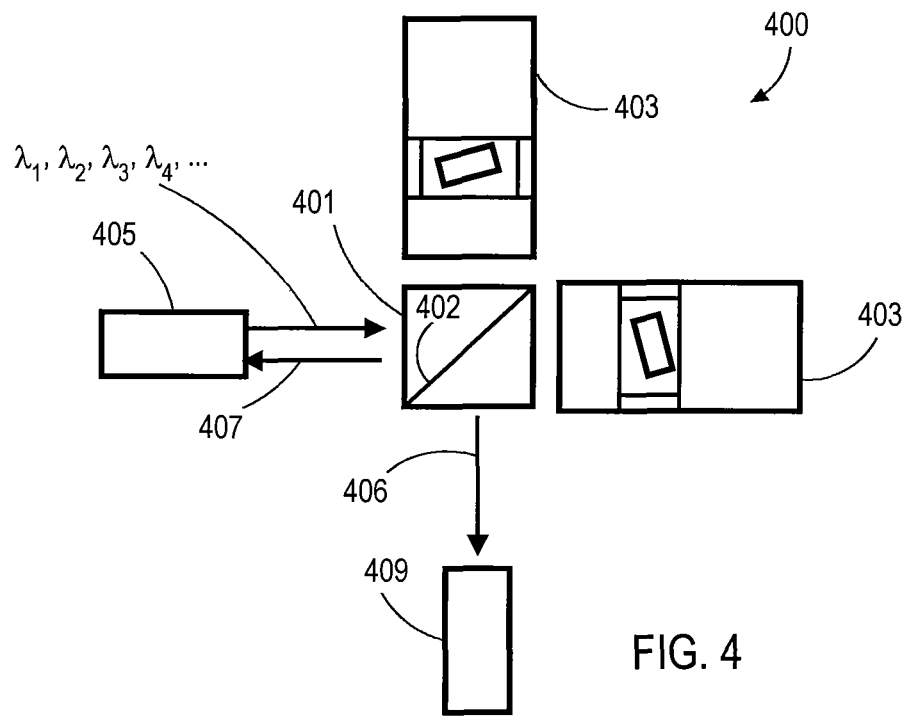
FIG. 4 is a schematic diagram illustrating a deinterleaver based on a Michelson interferometer using etalons with temperature-compensated cavity length and/or post-assembly fine-tuning adjustment, according to embodiments of the invention.

FIG. 4 is a schematic diagram illustrating a deinterleaver 400 based on a Michelson interferometer using etalons with temperature-compensated cavity length and/or post-assembly fine-tuning adjustment, according to embodiments of the invention. Deinterleaver 400 uses a single non-polarization beam splitter 401 for separating and recombining the beams. In the embodiment illustrated in FIG. 4, non-polarization beam splitter 401 includes a partially transmissive mirror 402. Deinterleaver 400 also includes two etalons 403 that are substantially similar in organization and operation to etalon 100, 200, and/or 300, as described above. Because etalons 403 may include temperature-compensated cavity length and/or post-assembly fine-tuning adjustment, deinterleaver 400 is not subject to temperature-related drift and can be precisely centered on an ITU grid as desired.

In operation, deinterleaver 400 receives a plurality of input wavelength channels ($\lambda_1, \lambda_2, \lambda_3, \lambda_4, \ldots$) directed to deinterleaver 400 from input/output 405, separates the even- and odd-numbered wavelength channels into a first output beam 406 ($\lambda_1, \lambda_3, \ldots$) and a second output beam 407 ($\lambda_2, \lambda_4, \ldots$), and directs first output beam 406 to output 409 and second output beam 407 to input/output 405. In keeping with the normal operation of a WDM interleaver, the input wavelength channels ($\lambda_1, \lambda_2, \lambda_3, \lambda_4, \ldots$) are at a first channel spacing, e.g. 50 GHz, whereas first output beam 406 and second output beam 407 operate at a second channel spacing, e.g. 100 GHz, that is twice the width of the first channel spacing. Due to the reciprocity principle of optics, deinterleaver 400 can also be used as an interleaver of two wider channel spacing WDM signals into a single narrow channel spacing WDM signal.

Etalons according to embodiments of the invention may be incorporated into other types of optical interleavers, such as the one shown in U.S. Pat. No. 7,158,697, the entire contents of which are incorporated by reference herein.

Figure 5:
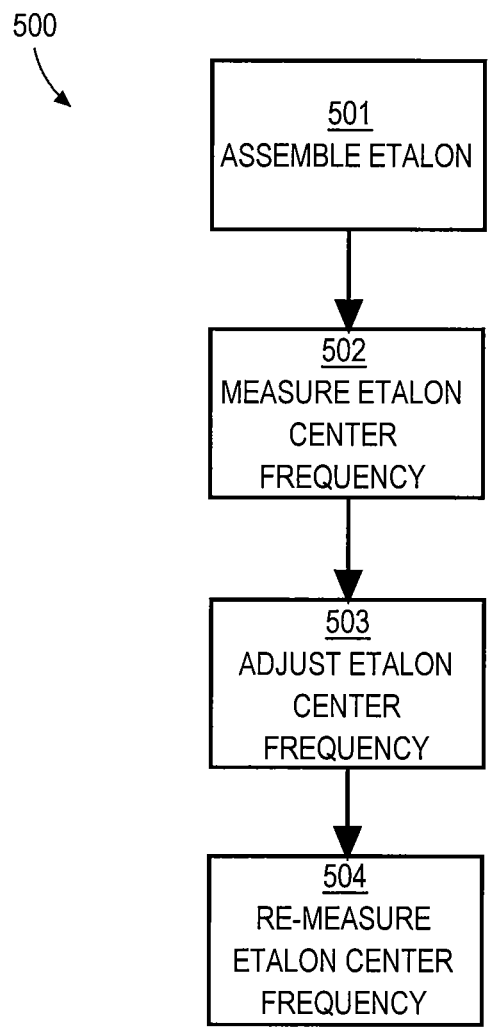
FIG. 5 is a flow chart that summarizes, in a stepwise fashion, a method for manufacturing an etalon, according to one or more embodiments of the invention.

FIG. 5 is a flow chart that summarizes, in a stepwise fashion, a method 500 for manufacturing an etalon, according to one or more embodiments of the invention. Method 500 is described in terms of an etalon substantially similar to etalons 100, 200, and 300, described above. However, other etalons may also benefit from the use of method 500.

In step 501, the components of the etalon are selected and assembled using methods commonly known in the art. The assembled components include mirrors 101, 102, spacers 107, 108, tuning plate 104, screw adjustment 301, and bending beam spring 302. For example, the selected components may be coupled together using a thermal epoxy. In some embodiments, the assembled components further include bimetal support arm 105.

In step 502, alignment of etalon center frequency with the ITU grid is measured using methods commonly known in the art. For example, etalon center frequency alignment may be confirmed optically using an oscilloscope to monitor pass band.

In step 503, alignment of etalon center frequency is adjusted using screw adjustment 301 to elastically deform bending spring 302 and rotate tuning plate 104.

In step 504, alignment of etalon center frequency with the ITU grid is re-measured. Steps 503 and 504 may then be repeated as required.

In sum, embodiments of the invention provide an etalon with an effective cavity length that can be tuned to compensate for temperature-dependent frequency shift and/or random variations in the manufacturing process. A passive thermal compensation mechanism is used; therefore active temperature control, temperature measurement, or other complex systems are not required. In addition, the use of a screw adjustment and bending beam spring allows precise post-manufacturing tuning of an etalon to substantially eliminate manufacturing-related frequency offset from a desired resonance frequency.

In the embodiments of the etalon described above, the cavity formed between the mirrors contains air. In alternative embodiments of the invention, the cavity may contain any appropriate gas or may even be under vacuum condition.

While the foregoing is directed to embodiments of the present invention, other and further embodiments of the invention may be devised without departing from the basic scope thereof, and the scope thereof is determined by the claims that follow.

We claim:

1. An etalon comprising:
   first and second mirrors that form a cavity therebetween;
   a tuning plate disposed in the cavity; and
   a support for the tuning plate made of at least two materials having different coefficients of thermal expansion (CTEs) to cause an angle formed between the tuning plate and an optical axis of the etalon to vary as a function of temperature.

2. The etalon according to claim 1, wherein said at least two materials are metals having different CTEs.

3. The etalon according to claim 1, wherein said at least two materials are elastic materials having different CTEs.

4. The etalon according to claim 1, wherein the support comprises a first plate directly supporting the tuning plate and a second plate mounted directly to the first plate, the first and second plates having different CTEs.

5. The etalon according to claim 1, wherein the support comprises a first plate directly supporting the tuning plate and having a cutout, and a second plate that spans the cutout, the first and second plates having different CTEs.

6. An etalon comprising:
   first and second mirrors that form a cavity therebetween;
   a tuning plate disposed in the cavity;
   a support for the tuning plate; and
   a manual control for positioning the tuning plate with respect to an optical axis of the etalon; wherein the support is mechanically coupled to a spring and the manual control, and operation of the manual control causes movement of the support and the tuning plate by way of the spring.

7. The etalon according to claim 6, wherein an operation of the manual control varies an angle formed between the tuning plate and the optical axis of the etalon.

8. An etalon comprising:
   first and second mirrors that form a cavity therebetween;
   a tuning plate disposed in the cavity;

a support for the tuning plate, wherein the support is made of at least two materials having different coefficients of thermal expansion (CTEs) to cause the angle formed between the tuning plate and the optical axis of the etalon to vary as a function of temperature; and a manual control for positioning the tuning plate with respect to an optical axis of the etalon.

9. The etalon according to claim 8, wherein the support comprises a first plate directly supporting the tuning plate and a second plate mounted directly to the first plate, the first and second plates having different CTEs.

10. The etalon according to claim 8, wherein the support comprises a first plate directly supporting the tuning plate and having a cutout, and a second plate that spans the cutout, the first and second plates having different CTEs.

11. An etalon comprising:
   first and second mirrors that form a cavity therebetween, wherein a length of the cavity changes as a function of temperature; and
   a tuning plate disposed in the cavity and having an angle of incidence with respect to an optical axis of the etalon, that changes as a function of temperature to compensate for the change in the length of the cavity.

12. The etalon according to claim 11, wherein a temperature change causes an increase or decrease in the length of the cavity and also causes a change in an optical path length of a beam passing through the tuning plate to compensate for the increase or decrease in the length of the cavity.

13. The etalon according to claim 11, wherein the change in the optical path length is equal to the amount of the increase or decrease in the length of the cavity.

14. The etalon according to claim 11, wherein the length of the cavity changes as a function of temperature in a direction that is substantially aligned with the optical axis of the etalon.

15. The etalon according to claim 11, further comprising:
   a support for the tuning plate made of at least two materials having different coefficients of thermal expansion (CTEs) to cause an angle formed between the tuning plate and the optical axis of the etalon to vary as a function of temperature.

16. The etalon according to claim 15, wherein said at least two materials are metals having different CTEs.

17. The etalon according to claim 15, wherein said at least two materials are elastic materials having different CTEs.

18. The etalon according to claim 15, wherein the support comprises a first plate directly supporting the tuning plate and a second plate mounted directly to the first plate, the first and second plates having different CTEs.

19. The etalon according to claim 15, wherein the support comprises a first plate directly supporting the tuning plate and having a cutout, and a second plate that spans the cutout, the first and second plates having different CTEs.

* * * * *